(12) United States Patent
Odoi et al.

(10) Patent No.: US 8,042,858 B2
(45) Date of Patent: Oct. 25, 2011

(54) RETRACTABLE ROOF AND VEHICLE INCLUDING THE SAME

(75) Inventors: Kozo Odoi, Hiroshima (JP); Shigeki Hiyama, Hiroshima (JP); Tomoaki Matsunobu, Hiroshima (JP)

(73) Assignee: Webasto AG (DE)

( * ) Notice: Subject to any disclaimer, the term of this patent is extended or adjusted under 35 U.S.C. 154(b) by 375 days.

(21) Appl. No.: 12/294,133

(22) PCT Filed: Mar. 28, 2007

(86) PCT No.: PCT/JP2007/056606
§ 371 (c)(1),
(2), (4) Date: Oct. 26, 2008

(87) PCT Pub. No.: WO2007/114149
PCT Pub. Date: Oct. 11, 2007

(65) Prior Publication Data
US 2010/0283286 A1 Nov. 11, 2010

(30) Foreign Application Priority Data
Mar. 28, 2006 (JP) .................................. 2006-088589

(51) Int. Cl.
*B60J 7/08* (2006.01)
(52) U.S. Cl. ............... 296/108; 296/107.01; 296/107.07

(58) Field of Classification Search ............. 296/107.01, 296/107.07, 107.17, 108, 116
See application file for complete search history.

(56) References Cited

U.S. PATENT DOCUMENTS

| 6,390,532 | B1 | 5/2002 | Mac Farland |
| 6,866,325 | B2 * | 3/2005 | Willard .................... 296/108 |
| 2004/0174039 | A1 | 9/2004 | Dilluvio |

FOREIGN PATENT DOCUMENTS

| EP | 1 092 580 A1 | 4/2001 |
| JP | 2002-264658 | 9/2002 |
| JP | 2003-246222 | 9/2003 |

OTHER PUBLICATIONS

Extended European Search Report dated Dec. 23, 2009; Application No. 07740044.8-1268/2006139 PCT/JP2007056606.

\* cited by examiner

*Primary Examiner* — Lori Lyjak
(74) *Attorney, Agent, or Firm* — Studebaker & Brackett PC; Donald R. Studebaker

(57) ABSTRACT

A retractable roof includes a roof member 2 including a front roof panel 21, a back roof panel 22, and a linkage mechanism 4 for alternately chaining the position of the roof member 2 between an in-use position and a storage position. The back roof panel 22 is pivotally connected to the front roof panel 21 and a car body side member 42 to function as a first link of a four-bar link constituted by the first link and a second link.

6 Claims, 9 Drawing Sheets

RETRACTABLE ROOF AND VEHICLE INCLUDING THE SAME

TECHNICAL FIELD

The present invention relates to a retractable roof and a vehicle including it.

BACKGROUND ART

For example, Patent Document 1 discloses a retractable roof changeable between an in-use position to cover the passenger compartment and a storage position to be stowed in a storage room to open the passenger compartment.

The retractable roof disclosed in the above-mentioned document includes a front roof panel, a back roof panel, and a pair of four-bar links disposed on the respective sides in the vehicle width direction of the passenger compartment. Each four-bar link includes first and second links pivotally connected to the front roof panel and a car body side member to link the car body side member to the front roof panel. The back roof panel is fixed to one of the of links of each pair.

The above linkage configuration enables the retractable roof to change its position between an in-use position in which the front roof panel covers the passenger compartment from above while the back roof panel covers the rear part of the passenger compartment and a storage position in which the front and back roof panels are stowed in a vertically overlying relationship in the storage room.

Patent Document 1: Japanese Unexamined Patent Application Publication 2002-264658

SUMMARY OF THE INVENTION

Problems that the Invention is to Solve

In the above conventional retractable roof, however, the first and second two links constituting a four-bar link are pivotally and directly connected to the front roof panel and the car body side member, resulting in that both the links are disposed to have a rising gradient towards the front when the roof is in its use state. This makes especially the front side link of the first and second links to protrude up to the vicinity of the passenger's head, thereby narrowing the space of the passenger compartment in the vertical direction. In other words, the head clearance is reduced.

Further, the first and second links, which are pivotally and directly connected to the front roof panel and the car body side member, move in a manner crossing each other in position change of the roof. This requires for the two links to be spaced apart from each other in the vehicle widthwise direction in the passenger compartment. As a result, the links are disposed at the interior side of the passenger compartment to narrow the passenger compartment in the vehicle widthwise direction.

Thus, the conventional retractable roof having such a link mechanism restricts the passenger compartment space, which leads to reduced comfortableness.

Means for Solving the Problems

The present invention has been made in view of the foregoing and has its object of providing a retractable roof and a vehicle of which comfortableness is improved by widening the space of the passenger compartment.

In one aspect of the present invention, a retractable roof includes a roof member for covering a passenger compartment; and a linkage mechanism for alternately changing a position of the roof member between an in-use position in which the roof member covers the passenger compartment and a storage position in which the roof member is stowed in a storage room formed at the rear of the passenger compartment to open the passenger compartment.

The roof member includes a front roof panel for covering the passenger compartment from above and a back roof panel, disposed at the rear of the front roof panel, for covering a rear part of the passenger compartment, the linkage mechanism includes a four-bar link constituted by first and second links each pivotally connected to the front roof panel and a car body side member, and the back roof panel is pivotally connected to the front roof panel and the car body side member to function as the first link.

In the above arrangement, the linkage mechanism including the four-bar link changes the position of the roof member including the front roof panel and the back roof panel alternately between the use position and the storage position.

Further, the back roof panel is pivotally connected to the front roof panel and the car body side member to function as the first link of the first and second links constituting the four-bar link.

Accordingly, the first link, that is, a member disposed inside the passenger compartment and extends, when the roof is in its use state, inward of the passenger compartment, is dispensed with, thereby extending the space of the passenger compartment in the vertical direction.

In addition, the elimination of the first link eliminates the need to space the two links apart from each other in the vehicle widthwise direction, thereby extending the space of the passenger compartment in the vehicle widthwise direction.

Thus, the retractable roof as structured above has the space of the passenger compartment extended in the vertical direction and in the vehicle widthwise direction, thereby improving the comfortableness.

Moreover, the elimination of the first link accompanies weight reduction of the retractable roof. This is advantageous in stabilization of the position change operation of the roof member and in improvement on the durability of the linkage mechanism.

The back roof panel may be pivotally connected at a part thereof which is on a front side of a pivot point of the second link to the front roof panel.

The first and second links constituting the four-bar link are arranged alongside each other in the front-to-rear direction in general when the roof member is in its use state. In the above arrangement, however, the back roof panel functions as the front side link of the first and second links to eliminate the need to provide a link member largely extending inward of the passenger compartment and to result in an arrangement of the second link away from the passengers, thereby further widening the space of the passenger compartment.

The back roof panel may be divided into a back window and a middle roof panel disposed between the back window and the front roof panel, wherein the linkage mechanism further includes a pair of link levers pivotally connected to the back window and the middle roof panel to constitute a secondary four-bar link, and the back window is moveable relative to the middle roof panel in alternate position change between the use position and the storage position and disposed in a superposed relationship with the middle roof panel in the storage position as viewed from a side. In this arrangement, the middle roof panel functions as the first link.

With the above arrangement, the roof member is stowed compactly in the vertical direction. This is advantageous in downsizing the storage room.

Further, as described above, the linkage mechanism does not employ the structure in which the two link levers are spaced apart from each other in the vehicle widthwise direction in the passenger compartment, so that the back window relatively movable to the middle roof panel can be enlarged in the vehicle widthwise direction. This is advantageous in increasing the degree of freedom of style and design.

The middle roof panel may include an upper end part fixed to an upper arm through which the middle roof panel is pivotally connected to the front roof panel and a lower end part fixed to a lower arm through which the middle roof panel is pivotally connected to the car body side member, wherein the secondary four-bar link is disposed between the upper arm and the lower arm.

With the above arrangement, the secondary four-bar link, which restricts the relative movement of the middle roof panel to the back window, will not be overlapped with the upper and lower arms in the vehicle widthwise direction. Accordingly, the secondary four-bar link is arranged at the exterior side in the vehicle widthwise direction in the passenger compartment, thereby widening the space of the passenger compartment.

The second link may include: a window link lever pivotally connected to the back window and the car body side member; the back window; the secondary four-bar link; and a control link pivotally connected to one of the pair of link levers constituting the secondary four-bar link or the back window and pivotally connected to front roof panel.

With the above arrangement, the second link is constituted by a plurality of comparatively short links members connected to each other to eliminate the need to provide a single long link member for constituting the second link. As a result, the inward protrusion of the link member in the passenger compartment can be suppressed further. Since such a long link member, which is a comparatively heavy member for securing its rigidity, is needless, the weight of the retractable roof is saved.

Moreover, the second link includes the back window to reduce the number of members constituting the link, which is advantageous in space widening of the passenger compartment, in reduction in the number of components of the retractable roof, and in weight reduction thereof.

The position change operation of the roof member must be synchronized with the relative movement of the back window to the middle roof panel. In the above arrangement, the synchronization is realized by pivotally connecting the control link to one of the pair of link levers or the back window. Namely, the control link contributes to both the position change operation of the roof member and the relative movement of the back window to the middle roof panel. This eliminates the need to provide an additional link member for only synchronizing the position change operation with the relative movement.

In accordance with another aspect of the present invention, a retractable roof includes a front roof panel for covering a passenger compartment from above; a back window for covering a rear part of the passenger compartment; a middle roof panel disposed between the front roof panel and the back window and pivotally connected to the front roof panel and a car body side member; a window link lever pivotally connected to the back window and the car body side member; a pair of link levers pivotally connected to the back window and the middle roof panel to constitute a four-bar link; and a control link pivotally connected to one of the pair of link levers or the back window and pivotally connected to the front roof panel.

In the above arrangement, the middle roof panel constitutes one link connecting the front roof panel and the car body side member while the window link lever, the back window, the secondary four-bar link, and the control link constitute the other link connecting the front roof panel and the car body side member.

Accordingly, the four-bar link connecting the front roof panel and the car body side member is constituted to eliminate the need to provide a link member for directly connecting the front roof panel and the car body side member, thereby suppressing the inward protrusion of the link member in the passenger compartment. As a result, the space of the passenger compartment is widened to improve the comfortableness.

In a vehicle including either of the above retractable roofs, the protrusion of the link member is suppressed as described above, thereby widening the space of the passenger compartment to improve the comfortableness.

EFFECTS OF THE INVENTION

As described above, the present invention eliminates the need to provide one of the two links constituting the four-bar link by making the back roof panel to function as the first link, thereby suppressing the inward protrusion of the link member in the passenger compartment. This widens the space of the passenger compartment to improved the comfortableness.

Figure 1:
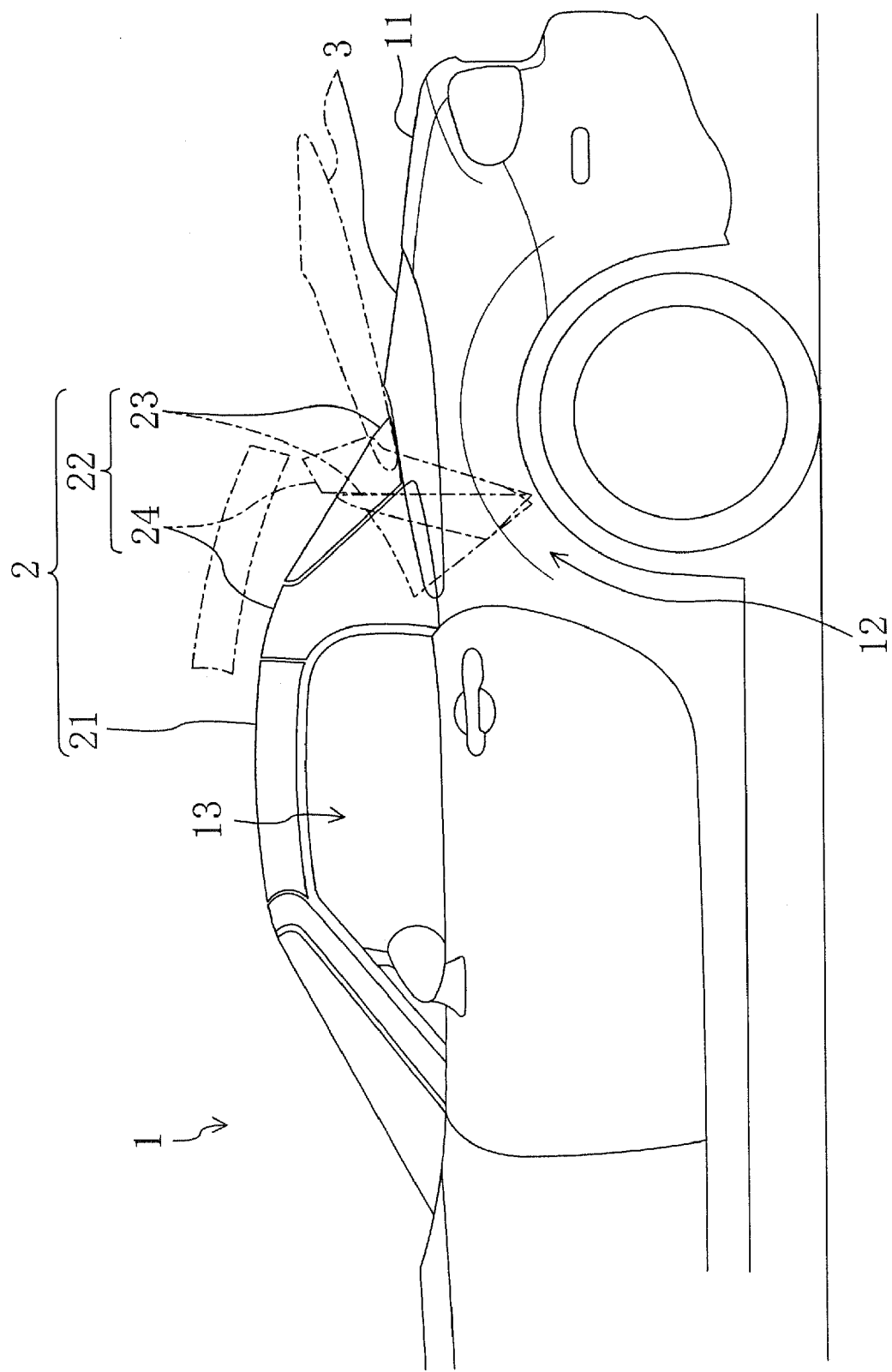
FIG. 1 is a side view of a vehicle in a state where a retractable roof is at an in-use position.

INDEX OF REFERENCE NUMERALS 1 vehicle
12 storage room
13 passenger compartment
2 retractable roof (roof member)
21 front roof panel
22 back roof panel
23 back window
24 middle roof panel
4 linkage mechanism
43 lower arm
44 window link lever
45 secondary four-bar link 45a first link lever
45b second link lever
47 upper arm
48 control link

BEST MODE FOR CARRYING OUT THE INVENTION

An embodiment of the present invention will be described in detail below with reference to the drawings. The following description of the preferred embodiment is merely illustrative in nature and is not intended to limit the scope, applications, and use of the present invention.

Figure 2:
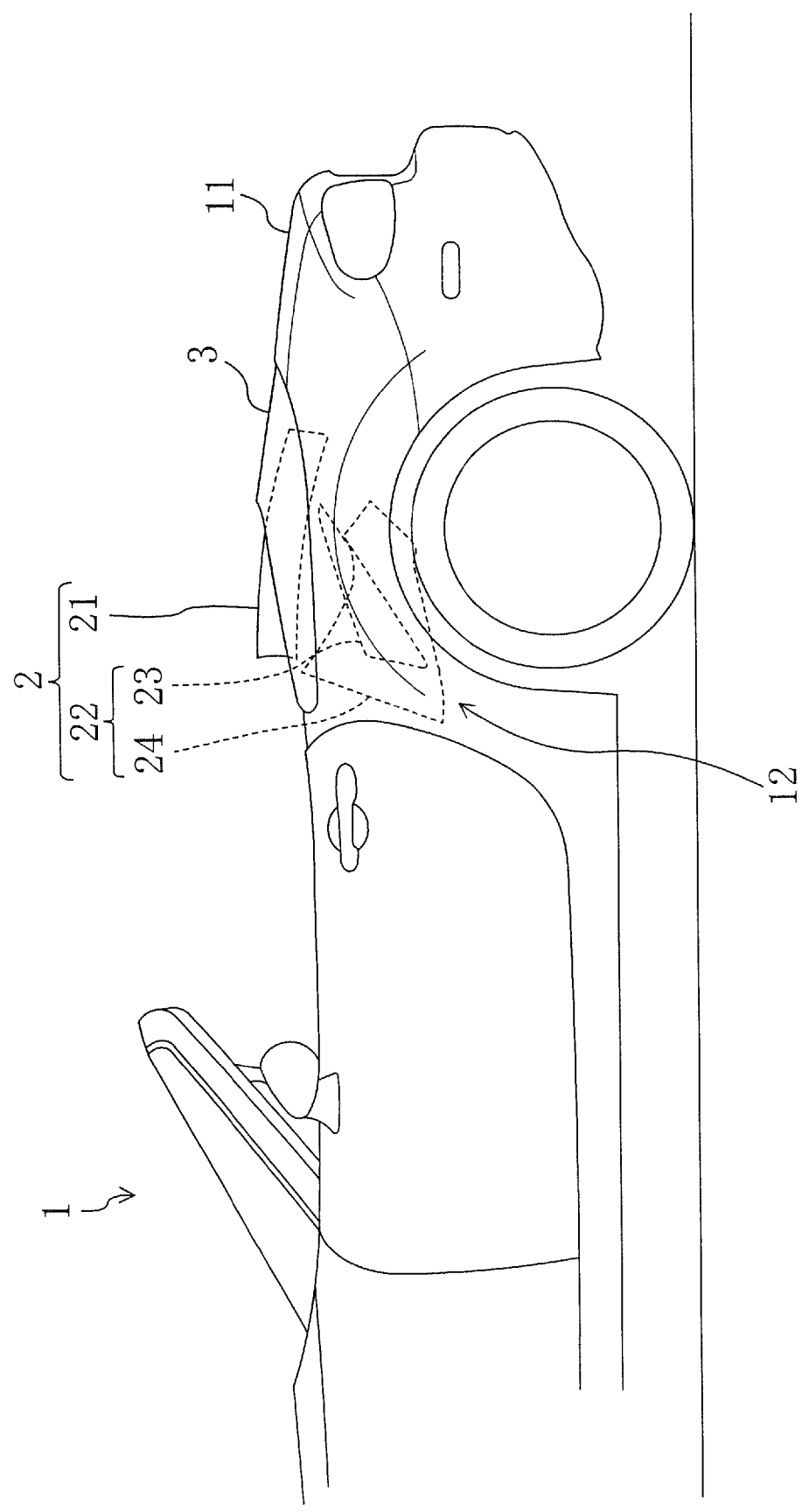
FIG. 2 is a side view of the vehicle in a state where the retractable roof is at a storage position.

FIG. 1 and FIG. 2 are side views schematically showing a vehicle 1 on which a retractable roof according to the present invention is boarded. The retractable roof (roof member) 2 includes a front roof panel 21 for covering a passenger compartment from above and a back roof panel 22, disposed at the rear of the front roof panel 21, for covering the rear part of the passenger compartment 13. The back roof panel 22 includes a back window 23 made of a transparent material and a middle roof panel 24 disposed between the front roof panel 21 and the back window 23 to constitute a pillar for the vehicle 1.

Each of the front and middle roof panels 21 and 24 is formed by joining an outer panel layer 25 forming the outer surface of the roof to an inner panel layer 26 arranged on the vehicle interior side of the outer panel layer 25. A plate-shaped reinforcement 27 is appropriately provided between the outer and inner panel layers 25 and 26 (see FIG. 6). The outer and inner panel layers 25 and 26 are made of, for example, resin, while the reinforcement 27 is made of metal. Thus, the retractable roof 2 can be saved in weight.

A trunk room is formed in the rear part of the vehicle 1, and the opening of the trunk room is closed by an openable trunk lid 11. Between the passenger compartment 13 and the trunk room, a storage room 12 for stowing the retractable roof 2 is formed open upward.

A deck lid 3 is disposed at the upper end opening of the storage room 12. When the retractable roof 2 covers the passenger compartment 13 (i.e., when it is in an in-use position as will be described later), the deck lid 3 is positioned between the rear edge of the roof 2 and the opening edge of the storage room 12. Thus, the deck lid 3 closes part of the upper end opening of the storage room 12.

The retractable roof 2 is changeable in position, by a linkage mechanism not shown in FIG. 1 and FIG. 2, between an in-use position to cover the passenger compartment 13 (see FIG. 1) and a storage position to set the passenger compartment 13 open by being stowed in the storage room 12 (see FIG. 2). The deck lid 3 is also changeable in position, by another linkage mechanism (not shown) different from the linkage mechanism for position change of the retractable roof 2, between a home position to cover part of the upper end opening of the storage room 12 (see FIG. 1 and FIG. 2) and a back-off position to be backed off rearward and diagonally upward from the home position to set the upper end opening of the storage room 12 open (see the dot-dash lines in FIG. 1).

A brief description will be given here of the position change operation of the retractable roof 2, i.e., the operation for changing the retractable roof 2 from its position to cover the passenger compartment 13 to its position to set the passenger compartment 13 open, with reference to FIG. 1 and FIG. 2. First, the deck lid 3 is moved, by the associated linkage mechanism, from its home position shown by the solid lines in FIG. 1 to its back-off position shown by the dot-dash lines in FIG. 1 to set the upper end opening of the storage room 12 open. Simultaneously therewith or after a predetermined time elapses, the linkage mechanism for the retractable roof 2 operates to turn the middle roof panel 24 backward (clockwise in FIG. 1) about a predetermined pivot axis, thereby allowing the front roof panel 21 to slide rearward and diagonally upward. Also, the back window 23 moves downward while moving frontward relative to the middle roof panel 24 (see the dot-dash lines in FIG. 1).

When the linkage mechanism for the retractable roof 2 further operates, as shown by the partly broken lines in FIG. 2, the front and middle roof panels 21 and 24 are stowed in a vertically overlying relationship into the storage room 12. At this time, the back window 23 is brought into a superposed relationship with the middle roof panel 24 as viewed along an axis extending in the vehicle widthwise direction (as viewed in the state shown in FIG. 2).

After the retractable roof 2 is stowed in the storage room 12, the linkage mechanism for the deck lid 3 operates to move the deck lid 3 from its back-off position to its home position, thereby closing part of the storage room 12. Thus, the passenger compartment 13 is opened.

On the other hand, for changing the retractable roof 2 from its position to set the passenger compartment 13 open to its position to cover the passenger compartment 13, the above operation is reversed.

Figure 3:
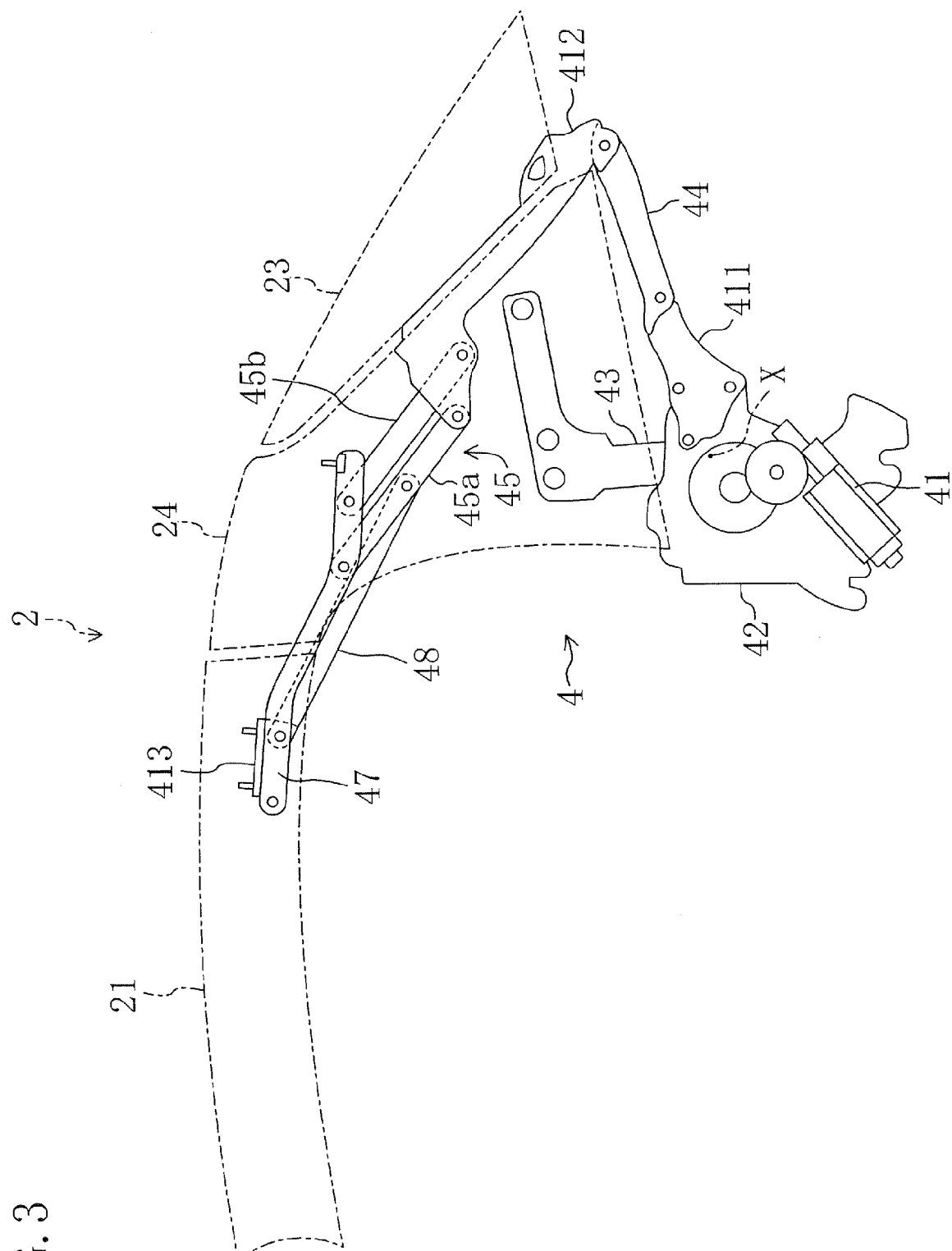
FIG. 3 is a side view showing a linkage mechanism of the retractable roof at the in-use position.
Figure 4:
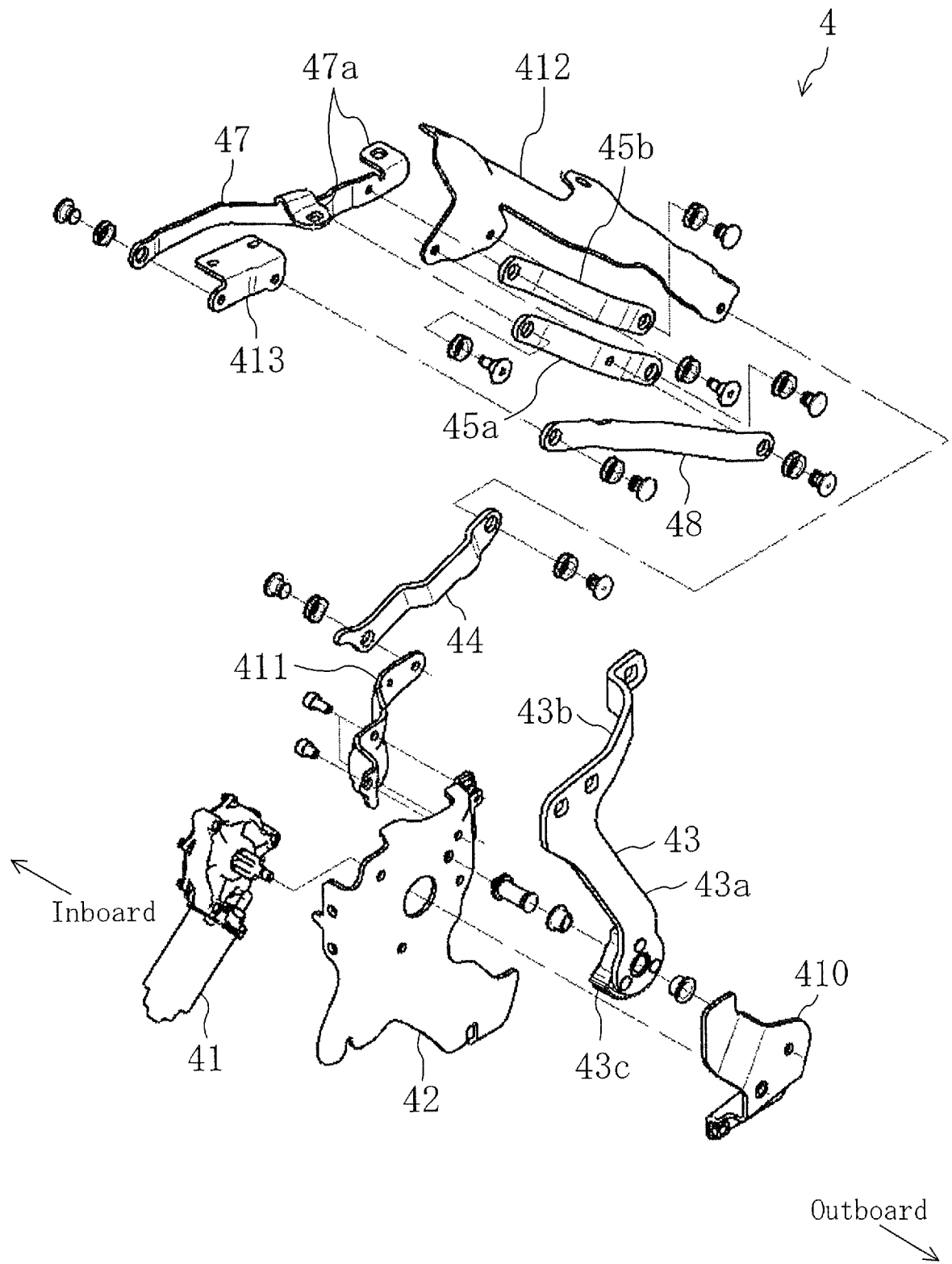
FIG. 4 is a exploded perspective view of the linkage mechanism.
Figure 5:
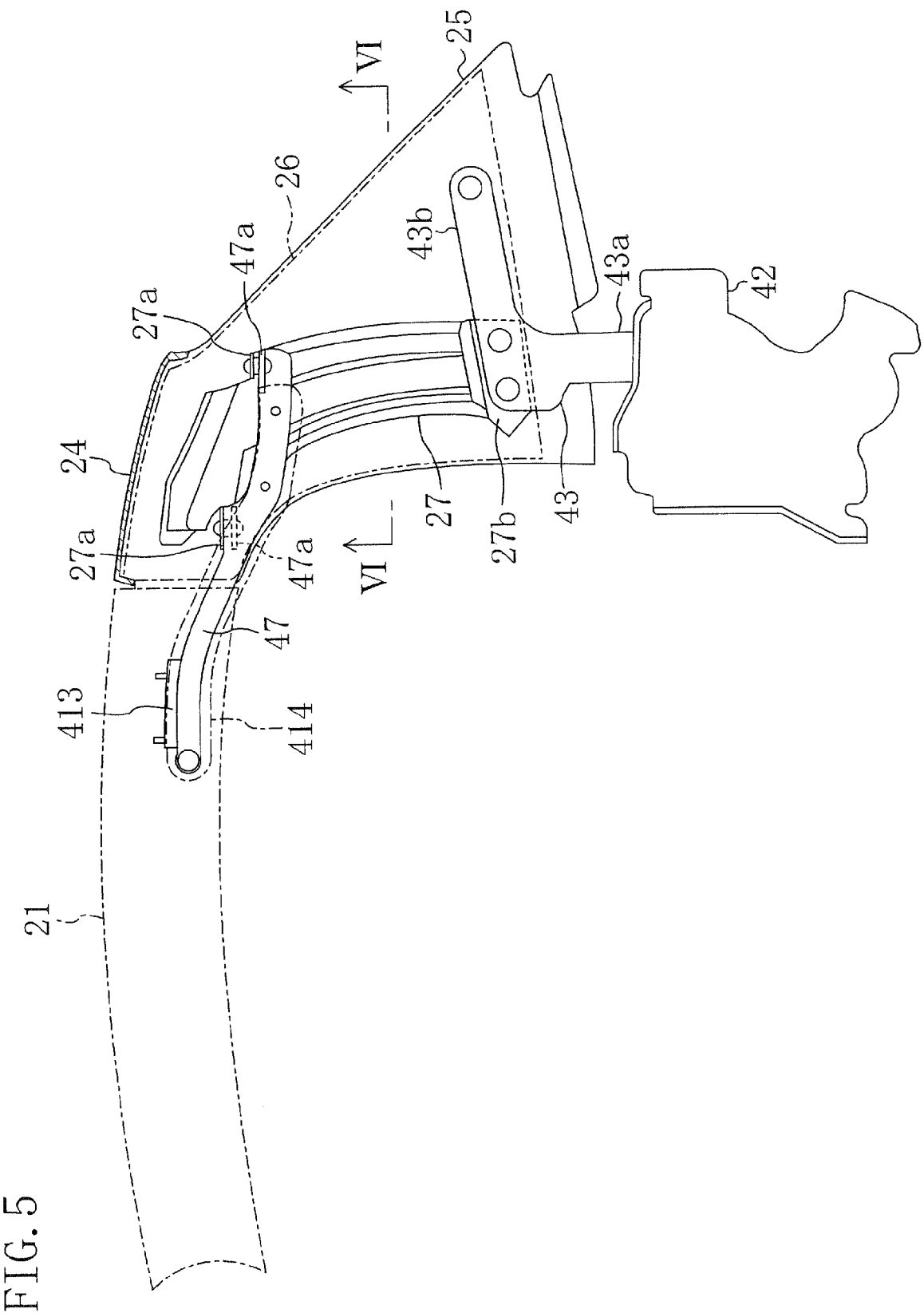
FIG. 5 is a side view showing a structure of a segmental link.

FIG. 3 to FIG. 5 illustrate the linkage mechanism 4 for the retractable roof 2. The linkage mechanism 4 is disposed on each side in the vehicle widthwise direction of the interior space of the retractable roof 2. Note that FIG. 3 and FIG. 5 are side views of the linkage mechanism 4 disposed on the right side in the vehicle widthwise direction of the interior space of the retractable roof 2 as viewed from the left side of the vehicle 1, and FIG. 4 is a perspective view showing the linkage mechanism 4 in disassembled form, which is to be disposed on the left side in the vehicle widthwise direction of the interior space of the retractable roof 2.

The linkage mechanism 4 includes a four-bar link essentially formed of first and second links each pivotally connected to the front roof panel 21 and a car body side member.

The linkage mechanism 4 is of electric motor-driven type in this embodiment. A drive motor 41 functioning as a drive source is fixed by means of a bolt or the like to a main bracket 42 fixed to the vehicle 1. The main bracket 42 is a member having substantially a plate shape and is disposed in the storage room 12. Thus, the main bracket 42 is located below the middle roof panel 24 when the retractable roof 2 is in its in-use position (see FIG. 3).

A lower arm 43 is attached to the vehicle exterior side of the main bracket 42. The lower arm 43 is sandwiched between the main bracket 42 and a base plate 410, so as to be attached thereto for pivotal movement relative to the main bracket 42 about a pivot axis X extending in the vehicle widthwise direction.

Figure 9:
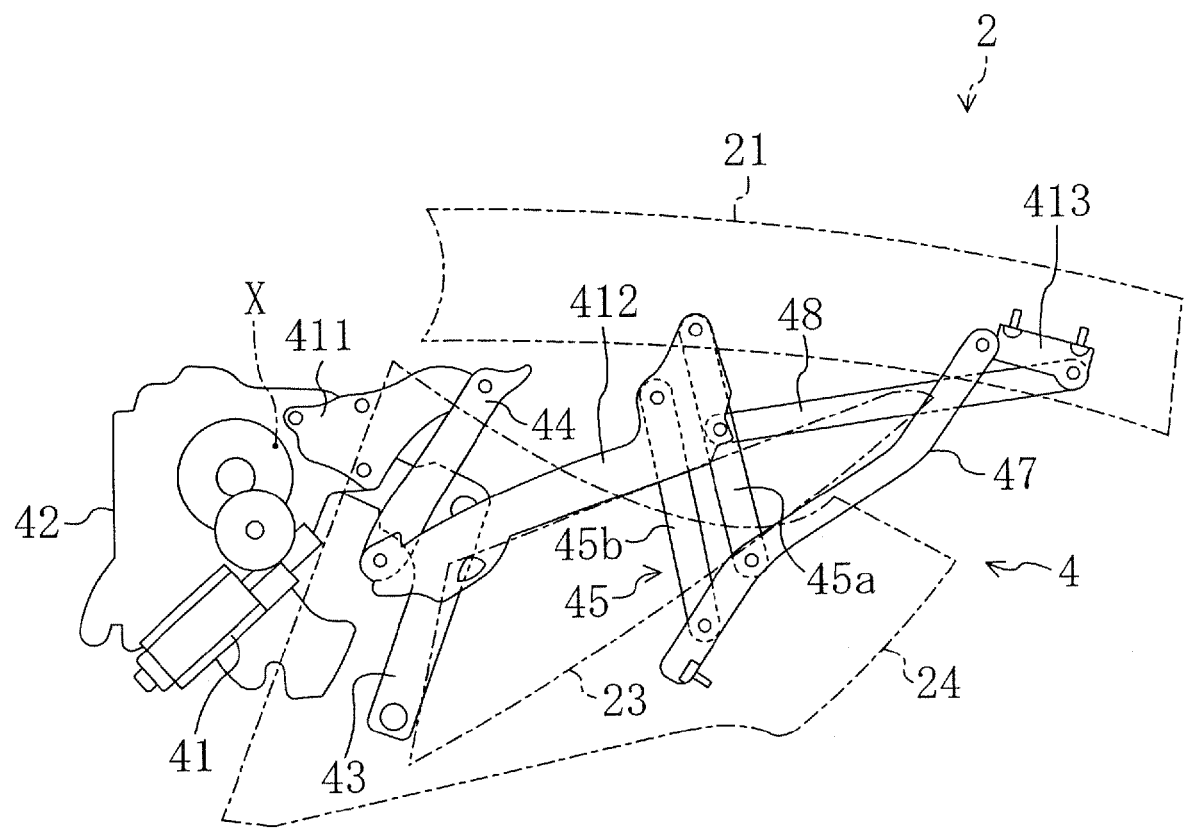
FIG. 9 is a side view showing the linkage mechanism of the retractable roof at the storage position.

The lower arm 43 includes an arm body 43a extending vertically and a fixed part 43b bent from the upper end part of the arm body 43a and fixed to the middle roof panel 24 as will be described later. A speed reduction gear 43c is fixed to the root end part of the arm body 43a so as to mesh with a drive gear mounted on the drive shaft of the drive motor 41. Thus, when the drive motor 41 is driven, the lower arm 43 turns about the pivot axis X between a position where the arm body 43a stands upright as shown in FIG. 3 and a position where the arm body 43a falls down rearward as shown in FIG. 9.

To the main bracket 42, a window bracket base 411 is also fixed which extends rearward and diagonally upward from the rear end part in the vicinity of the upper end of the main bracket 42. A window link lever 44 is pivotally connected to the rear end part of the window bracket base 411.

Through holes are formed at the front end part and the rear end part of the window link lever 44. The window link lever 44 is fixed to the rear end part of the window bracket base 411 by means of a bolt or the like with a bush inserted in the through hole at its front end part. Thus, the window link lever 44 is pivotally rotatable relative to the window bracket base 411 about an axis extending in the vehicle widthwise direction.

A window bracket 412 is fixed to each end part in the vehicle widthwise direction of the back window 23. The rear end part of the window link lever 44 is pivotally connected to the lower end part of the window bracket 412. Specifically, the window link lever 44 is attached to the lower end part of the window bracket 412 by means of a bolt or the like with a bush inserted in the through hole at its rear end part. Thus, the window link lever 44 is pivotally movable about an axis extending in the vehicle widthwise direction relative to the window bracket 412, namely, relative to the back window 23.

The upper end part of the window bracket 412 has two mounting holes formed with a specified distance left from each other in the front-to-rear direction. First and second link levers 45a and 45b are pivotally connected to the window bracket 412 at the two mounting holes.

The first and second link levers 45a and 45b are link levers having substantially the same length and are arranged alongside each other in the vehicle front-to-rear direction to have a rising gradient towards the front when the retractable roof 2 is in its in-use position. Each of the first and second link levers 45a and 45b has through holes formed at its upper and lower end parts. The first and second link levers 45a and 45b are mounted to the upper end part of the window bracket 412 by mans of bolts or the like with bushes inserted in the through holes at their lower end parts. Thus, the first and second link levers 45a and 45b are pivotally movable relative to the window bracket 412 about their axes extending in the vehicle widthwise direction. In other words, they are pivotally connected to the back window 23.

Fixed to the upper end part of the middle roof panel 24 is an upper arm 47 extending frontward towards the front roof panel 21, as will be described later. The upper end parts of the first and second link levers 45a and 45b are pivotally connected to the upper arm 47. Specifically, the first and second link levers 45a and 45b are fixed to the rear end part of the upper arm 47 by means of bolts or the like with bushes inserted in through holes formed at their upper end parts. Thus, the first and second link levers 45a and 45b are pivotally movable relative to the upper arm 47 about their axes extending in the vehicle widthwise direction. In other words, the first and second link levers 45a and 45b are pivotally connected to the middle roof panel 24.

In this manner, the first and second link levers 45a and 45b are pivotally connected to the middle roof panel 24 and the back window 23. Accordingly, the first and second link levers 45a and 45b lie between the middle roof panel 24 and the back window 23 to function as the four-bar link (a secondary four-bar link 45) for restricting the relative movement of the middle roof panel 24 and the back window 23.

A front roof bracket 413 is fixed to the vicinity of the rear end of the front roof panel 21. The front end part of the upper arm 47 is pivotally connected to the front roof bracket 413. Specifically, the upper arm 47 has a through hole formed at its front end part and is fixed to the front roof bracket 413 by means of a bolt or the like with a bush inserted in this through hole. Thus, the upper arm 47 is pivotally movable relative to the front roof bracket 413 about an axis extending in the vehicle widthwise direction. In other words, the upper arm 47 is pivotally connected to the front roof panel 21.

The front roof bracket 413 has another mounting through hole formed at the rear of the pivotal point (the mounting hole) of the upper arm 47. To this mounting through hole of the front roof bracket 413, the upper end part of a control link 48 is pivotally connected.

The control link 48 is disposed to have a rising gradient towards the front when the retractable roof 2 is in its in-use position. The control link 48 has through holes formed at its upper and lower end parts. The control link 48 is fixed to the mounting through hole in the upper end part of the front roof bracket 413 by means of a bolt or the like with a bush inserted in this through hole. Thus, the control link 48 is pivotally movable relative to the front roof panel 21 about an axis extending in the vehicle widthwise direction. In other words, the control link 48 is pivotally connected to the front roof panel 21.

The first link lever 45a has a mounting hole formed in the middle thereof. The lower end part of the control link 48 is pivotally connected to this mounting hole of the first link lever 45a. Specifically, the control link 48 is fixed at its lower end part to the middle part of the first link lever 45a by means of a bolt or the like with a bush inserted in this through hole. Thus, the control link 48 is pivotally movable relative to the first link lever 45a about an axis extending in the vehicle widthwise direction. In other words, the control link 48 is pivotally connected to the secondary four-bar link 45.

Figure 6:
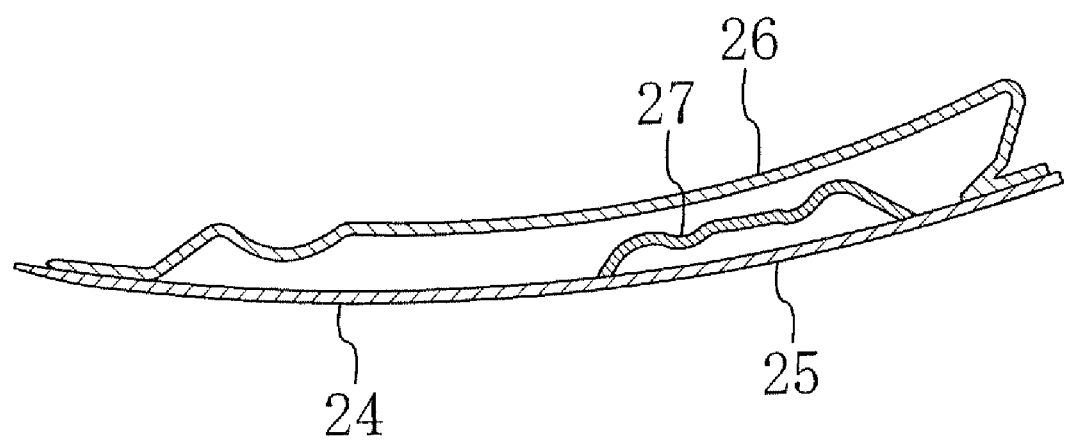
FIG. 6 is a sectional view taken along the line VI-VI in FIG. 5.
Figure 7:
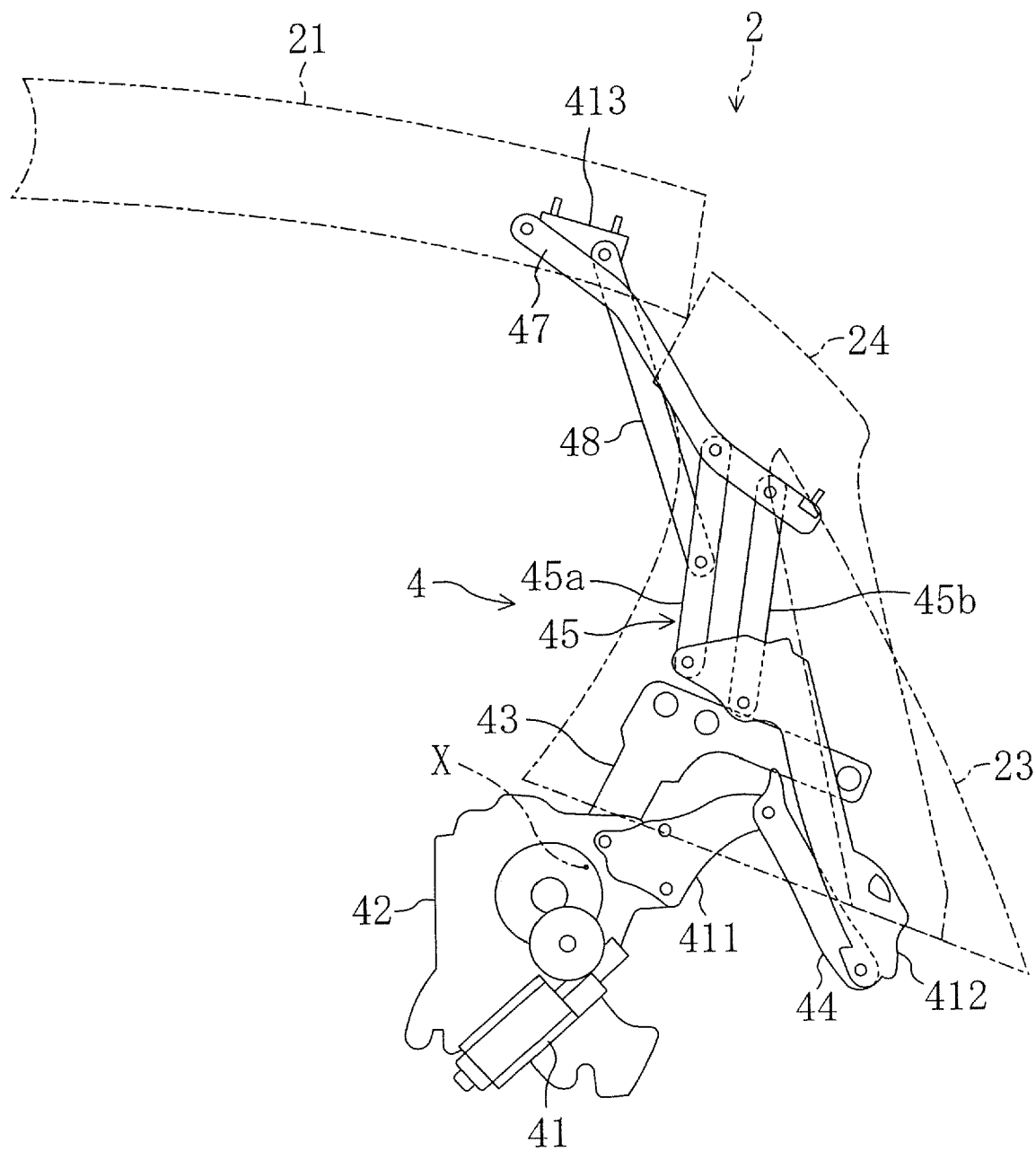
FIG. 7 is a side view showing the linkage mechanism of the retractable roof at a position between the in-use position and the storage position.
Figure 8:
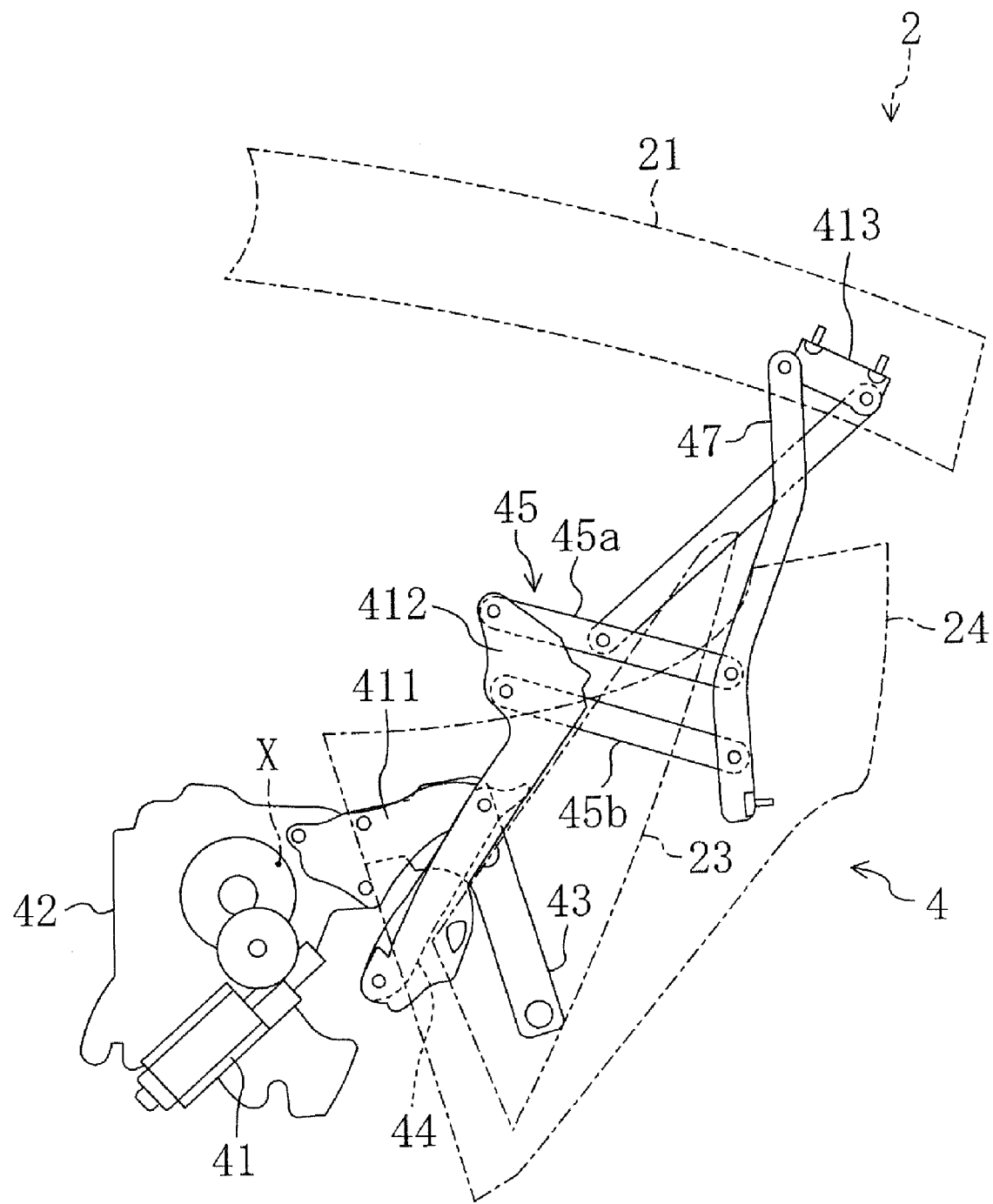
FIG. 8 is a side view showing the linkage mechanism of the retractable roof at a position between the in-use position and the storage position.

A detailed description will be given here of the connection structure of the middle roof panel 24 with the upper and lower arms 47 and 43 with reference to FIG. 5 and FIG. 6.

As described above, the middle roof panel 24 includes the outer panel layer 25, the inner panel layer 26, and the reinforcement 27 placed between the outer and inner panel layers 25 and 26. The upper and lower arms 47 and 43 are rigidly connected to the reinforcement 27.

The reinforcement 27 is substantially in a plate shape having a predetermined wave form in section. In the vicinity of the upper end thereof, two upper fixing parts 27a, 27b are formed to which the upper aim 47 is fixed. While in the vicinity of the lower end thereof, a lower fixing part 27b is formed to which the lower arm 43 is fixed. The upper fixing parts 27a and the lower fixing part 27b are exposed inside the passenger compartment 13.

Two fixed parts 47a and 47a are formed at the rear part of the upper arm 47. The two fixed parts 47a and 47a are located at the front and the rear of the two mounting holes of the upper arm 47 at which the first and second link levers 45a and 45b are pivotally connected, respectively. The fixed parts 47a and 47a are fixed to the upper fixing parts 27a and 27a of the reinforcement 27, respectively, by means of bolts or the like, whereby the upper arm 47 is rigidly connected to the reinforcement 27.

Furthermore, the fixed part 43b of the lower arm 43 is fixed to the lower fixing part 27b of the reinforcement 27 by means of a bolt or the like, whereby the lower arm 43 is rigidly connected to the reinforcement 27.

Reference numeral 414 in FIG. 5 denotes a cover attached to the upper arm 47 to cover it from below. The cover 414 prevents the upper arm 47 from being exposed to the passenger compartment 13, thereby improving the appearance of the passenger compartment 13.

As described above, the middle roof panel 24 is pivotally connected through the upper arm 47 to the front roof panel 21 and pivotally connected through the lower arm 43 to the main bracket 42. Thus, the middle roof panel 24 functions as one of the pair of links constituting part of a four-bar link.

In other words, one of the pair of links constituting part of the four-bar link is constituted by the lower arm 43, the middle roof panel 24 (the reinforcement 27), and the upper arm 47. This is equivalent to segmentation of the link into the lower arm 43, the reinforcement 27, and the upper arm 47. Furthermore, this segmental link functions as a drive link of the four-bar link because the lower arm 43 is driven by the drive motor 41.

On the other hand, the other (a driven link) of the pair of links as part of the four-bar link is constituted by the window link lever 44, the back window 23 (the window bracket 412), the first and second link levers 45*a* and 45*b*, and the control link 48.

The retractable roof 2 having the above structure moves as shown in FIG. 3 and FIG. 7 to FIG. 9 to change its position from the in-use position to the storage position. Note that FIG. 3, FIG. 9, FIG. 7, and FIG. 8 show a state in which the retractable roof 2 is in its in-use position, that in which the retractable roof 2 is in its storage position, that when approximately one third of the position change process of the retractable roof 2 from its in-use position to its storage position has passed, and that when approximately two thirds of the position change process have passed, respectively.

When the drive motor 41 starts to be driven, the speed reduction gear 43*c* amplifies the torque so that the lower arm 43 starts to turn about the pivot axis X clockwise in FIG. 3. Accompanied by the turning of the lower arm 43, the middle roof panel 24 starts to turn clockwise (see FIG. 3 and FIG. 7).

Accompanied by the turning of the middle roof panel 24, the front roof panel 21 pivotally connected to the middle roof panel 24 (through the upper arm 47) moves rearward and diagonally upward. The movement of the front roof panel 21 is restricted to a specified path because the control link 48 is pivotally connected to the front roof panel 21, in other words, because the four-bar link is formed between the front roof panel 21 and the main bracket 42.

In addition, accompanied by the turning of the middle roof panel 24, the middle roof panel 24 and the back window 23 relatively move, following the operation of the secondary four-bar link 45. Specifically, the back window 23 turns rearward while moving frontward relative to the middle roof panel 24 turning rearward.

When the drive motor 41 continues to be driven, the middle roof panel 24 further turns and is substantially laid down (see FIG. 8) while the front roof panel 21 further moves rearward and is then positioned above the middle roof panel 24.

When the drive motor 41 further continues to be driven, the middle roof panel 24 further turns rearward to be stowed into the storage room 12 (see FIG. 9). In association therewith, the front roof panel 21 moves downward and is then stowed into the storage room 12 to be positioned just above the middle roof panel 24 therein. Thus, the front and middle roof panels 21 and 24 lie one over the other. On the other hand, the back window 23 is brought into a superposed relationship with the middle roof panel 24 as viewed along an axis extending in the vehicle widthwise direction.

For changing the retractable roof 2 from its storage position to its in-use position, the retractable roof 2 moves in the reverse manner to that as described above.

In the above retractable roof 2, the middle roof panel 24 functions as one of the pair of links constituting part of the four-bar link which lie between the front roof panel 21 and the main bracket 42. Thus, the number of link members disposed in the passenger compartment 13 is reduced by one as compared with that in the conventional retractable roof, which saves the weight of the retractable roof 2.

Particularly, the upper arm 47 on the middle roof panel 24 is pivotally connected to the front roof bracket 413 at a point closer to the vehicle front than the control link 48 so that the middle roof panel 24 constitutes, as part of the four-bar link, the front side link of the pair of links arranged alongside each other in the vehicle front-to-rear direction. Accordingly, there is no link member largely protruding into the passenger compartment 13 when the retractable roof 2 is in its in-use position. In addition, the rear side link of the pair of links is disposed away from the passengers.

Furthermore, the rear side link is constituted by the window link lever 44, the back window 23 (the window bracket 412), the first and second link levers 45*a* and 45*b*, and the control link 48. Since the rear side link is constituted in this manner by a plurality of relatively short link members connected to each other, there is no need to provide a single long link member for connecting the front roof panel 21 to the main bracket 42. This also prevents any link member from protruding into the passenger compartment 13, thereby extending the space of the passenger compartment 13 vertically. In addition, the elimination of the need to provide a single long link member is advantageous in weight saving of the retractable roof 2.

The middle roof panel 24 functioning as one of the links of the four-bar link eliminates the need to space a pair of link members of the four-bar link apart from each other in the vehicle widthwise direction. Thus, the space of the passenger compartment 13 can be extended in the vehicle widthwise direction.

As described above, the space of the passenger compartment 13 is extended in the vertical direction and in the vehicle widthwise direction to improve the comfortableness in the passenger compartment 13.

Not only the middle roof panel 24 but also the back window 23 constitutes part of the link to reduce the number of members constituting the link, which is advantageous in space widening of the passenger compartment, in reduction in the number of components of the retractable roof, and in weight reduction thereof.

The link constituted by the middle roof panel 24 is a segmental link segmented in the upper arm 47, the lower arm 43, and the reinforcement 27, which are disposed between the outer panel layer 25 and the inner panel layer 26 of the middle roof panel 24. Accordingly, the middle part of the link is prevented from being exposed to the passenger compartment 13 to improve the appearance, and preparation of a trim member and the like for covering the link is unnecessary to widen the space of the passenger compartment.

The reinforcement 27 is basically a member for reinforcing the middle roof panel 24, and therefore, reduction in the number of components and in weight of the retractable roof 2 can be contemplated. When the middle roof 24 is made of resin, the retractable roof 2 can reduce its weight with the required rigidity as the roof and the link secured.

The back window 23 is movable relative to the middle roof panel 24 and, in a storage position of the retractable roof 2, is superposed on the middle roof panel 24 as viewed along an axis extending in the vehicle widthwise direction. Therefore, the retractable roof 2 can be vertically downsized in the storage room 12, and in turn, the storage room 12 can be downsized.

The secondary four-bar link, which realizes the relative movement of the back window 23 to the middle roof panel 24, is disposed between the upper arm 47 and the lower arm 43, thereby preventing the first and second link levers 45*a* and 45*b* and each arm 43, 47 from being overlapped with each other in the vehicle widthwise direction. Thus, the first and second link levers 45*a* and 45*b* can be arranged on the exterior side in the vehicle widthwise direction in the passenger compartment to contemplate space widening of the passenger compartment. In combination with the fact that the two links constituting part of the four-bar link is need not to be spaced apart from each other in the vehicle widthwise direction, the back window 23 can be enlarged in the vehicle widthwise direction. This increases the degree of freedom of style an design.

The synchronization of the position change operation of the retractable roof 2 with the relative movement of the back window 23 to the middle roof panel 24 is realized by pivotal connection of the control link 48 to the first link lever 45a. In other words, the control link 48 contributes to both the position change operation of the retractable roof 2 and the relative movement of the back window 23 to the middle roof panel 24. This eliminates the need to provide an additional link member for only synchronizing the above position change operation with the above relative movement. This is advantageous in space widening of the passenger compartment 13, in reduction in the number of component, and in weight saving.

The control link 48 is pivotally connected to the first link lever 45a in the above embodiment. Alternatively, even when the control link 48 is pivotally connected to the second link lever 45b, the retractable roof 2 can move just the same as above. As well, when the control link 48 is pivotally connected to the window bracket 412, the retractable roof 2 can move just the same as above. Wherein, the pivotal connection of the control link 48 with the front side first link lever 45a shortens the length of the control link 48 to suppress protrusion of the link member.

In the above embodiment, the back window 23 is allowed to function as a link member by using the control link 84, the first and second link levers 45a and 45b, and the window link lever 44. Alternatively, a link member functioning as one of the pair of links constituting part of the four-bar link may be provided additionally.

Furthermore, the back window 23 is moveable relative to the middle roof panel 24 in the above embodiment, but the present invention may be applied to a retractable roof in which the back window 23 is integrally formed with the middle roof panel 24.

In addition, the drive source of the linkage mechanism 4 is not limited to the motor 41 and may be another rotation actuator or an expansion actuator, such as a hydraulic cylinder or the like.

INDUSTRIAL APPLICABILITY

As described above, the present invention can eliminates the need to provide one of the two links constituting part of the four-bar link to improve the comfortableness of the space of the passenger compartment and is therefore useful as a retractable roof boarded on a vehicle.

The invention claimed is:

1. A retractable roof, comprising:
a roof member for covering a passenger compartment; and
a linkage mechanism for alternately changing a position of the roof member between an in-use position in which the roof member covers a passenger compartment and a storage position in which the roof member is stowed in a storage room formed at a rear of the passenger compartment to open the passenger compartment,
wherein the roof member includes a front roof panel for covering the passenger compartment from above and a back roof panel, disposed at the rear of the front roof panel, for covering a rear part of the passenger compartment,
the linkage mechanism includes a four-bar link constituted by first and second links each pivotally connected to the front roof panel and a car body side member,
the back roof panel is pivotally connected to the front roof panel and the car body side member to function as the first link, and
the back roof panel is pivotally connected at a part thereof which is on a front side of a pivot point of the second link to the front roof panel.

2. The retractable roof of claim 1, wherein
the back roof panel is divided into a back window and a middle roof panel disposed between the back window and the front roof panel,
the linkage mechanism further includes a pair of link levers pivotally connected to the back window and the middle roof panel to constitute a secondary four-bar link, and
the back window is moveable relative to the middle roof panel in alternate position change between the use position and the storage position and disposed in a superposed relationship with the middle roof panel in the storage position as viewed from a side.

3. The retractable roof of claim 2, wherein
the middle roof panel includes an upper end part fixed to an upper arm through which the middle roof panel is pivotally connected to the front roof panel and a lower end part fixed to a lower arm through which the middle roof panel is pivotally connected to the car body side member, and
the secondary four-bar link is disposed between the upper arm and the lower arm.

4. The retractable roof of claim 2, wherein the second link includes:
a window link lever pivotally connected to the back window and the car body side member;
the back window;
the secondary four-bar link; and
a control link pivotally connected to one of the pair of link levers constituting the secondary four-bar link or the back window and pivotally connected to front roof panel.

5. A retractable roof comprising:
a front roof panel for covering a passenger compartment from above;
a back window for covering a rear part of the passenger compartment;
a middle roof panel disposed between the front roof panel and the back window and pivotally connected to the front roof panel and a car body side member;
a window link lever pivotally connected to the back window and the car body side member;
a pair of link levers pivotally connected to the back window and the middle roof panel to constitute a four-bar link; and
a control link pivotally connected to one of the pair of link levers or the back window and pivotally connected to the front roof panel.

6. A vehicle comprising; a retractable roof, wherein the retractable roof includes:
a roof member including a front roof panel for covering a passenger compartment from above and a back roof panel, disposed at a rear of the front roof panel, for covering a rear part of the passenger compartment; and
a linkage mechanism for alternately changing a position of the roof member between an in-use position in which the roof member covers the passenger compartment and a storage position in which the roof member is stowed in a storage room formed at the rear of the passenger compartment to open the passenger compartment,
wherein the linkage mechanism includes a four-bar link constituted by first and second links pivotally connected to the front roof panel and a car body side member, and the back roof panel is pivotally connected to the front roof panel and the car body side member to function as the first link, and the back roof panel is pivotally connected at a part thereof which is on a front side of a pivot point of the second link to the front roof panel.

* * * * *